(12) United States Patent
Hinque

(10) Patent No.: US 8,701,726 B2
(45) Date of Patent: Apr. 22, 2014

(54) SELF-INFLATING TIRE

(75) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 317 days.

(21) Appl. No.: 13/221,506

(22) Filed: Aug. 30, 2011

(65) Prior Publication Data

US 2013/0048178 A1 Feb. 28, 2013

(51) Int. Cl.
  *B60C 19/00* (2006.01)
(52) U.S. Cl.
  USPC .......................................................... 152/450
(58) Field of Classification Search
  USPC ......... 152/415, 418, 419, 424, 425, 426, 450;
  417/233, 375, 379, 383
  See application file for complete search history.

(56) References Cited

U.S. PATENT DOCUMENTS

| 2,095,489 | A | 10/1937 | Cotton | |
|---|---|---|---|---|
| 7,225,845 | B2 * | 6/2007 | Ellmann | 152/426 |
| 8,042,586 | B2 * | 10/2011 | Losey et al. | 152/426 |
| 8,113,254 | B2 * | 2/2012 | Benedict | 152/426 |
| 8,235,081 | B2 * | 8/2012 | Delgado et al. | 152/419 |
| 2004/0112495 | A1 | 6/2004 | Weise | |
| 2011/0120611 | A1 | 5/2011 | Hansen | |

FOREIGN PATENT DOCUMENTS

| DE | 102005031099 | 1/2007 |
|---|---|---|
| EP | 1604842 | 12/2005 |
| FR | 2318747 | 2/1977 |
| WO | 2007134556 | 11/2007 |

OTHER PUBLICATIONS

EPO Search Report. Related U.S. Appl. No. 13/221,231, filed Aug. 30, 2011.

* cited by examiner

*Primary Examiner* — S. Joseph Morano
*Assistant Examiner* — Jean Charleston
(74) *Attorney, Agent, or Firm* — June E. Rickey

(57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to an inlet device for exhaust from the passageway or to an outlet device for direction into the tire cavity. The inlet device is positioned within the annular passageway 180 degrees opposite the outlet device such that sequential flattening of the air tube by the tire footprint effects pumping of air along the air passageway with the tire rotating in either a forward or reverse direction of rotation. The invention further includes an inlet device for regulating the inlet flow of the air tube pump.

8 Claims, 18 Drawing Sheets

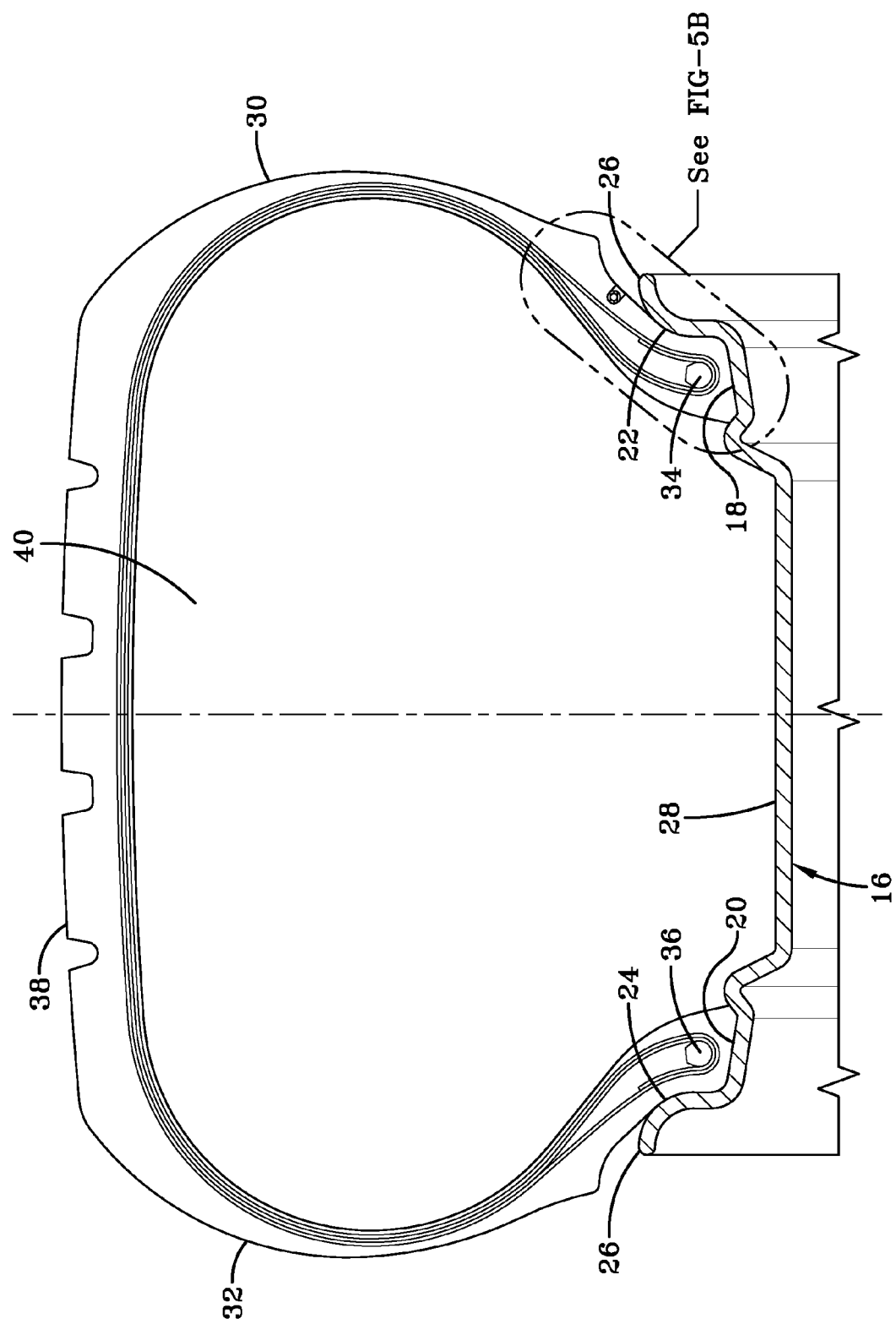

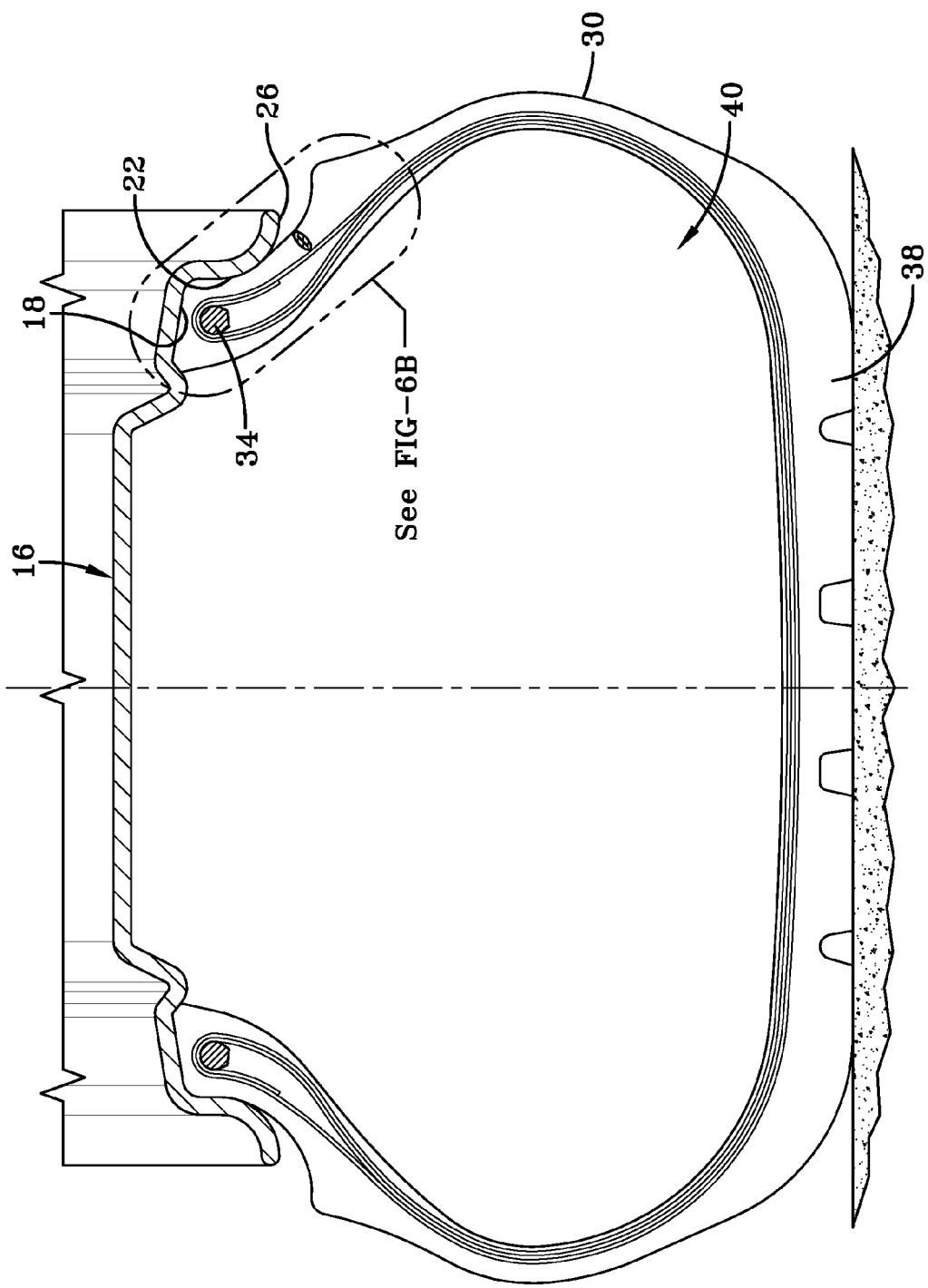

SELF-INFLATING TIRE

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a self-inflating tire assembly comprising a tire mounted to a rim, the tire having a tire cavity, and first and second sidewalls extending respectively from first and second tire bead regions to a tire tread region. The assembly further includes an air tube connected to the tire and defining an air passageway, the air tube being composed of a flexible material operative to allow a portion of the air tube segment near a tire footprint to substantially close the annular passageway. The assembly further includes an inlet regulator device connected to an inlet end of the air tube, the inlet regulator device includes an insert mounted in the tire, wherein the insert has a bore therethrough having a first end located in the tire cavity, and a second end which extends through the tire, wherein a pressure membrane is received within the first end of the insert, and a regulator body is received within the second end of the insert, wherein the regulator body has a interior passageway which extends from a first end to a distal end, wherein the distal end extends into a cavity of the insert, wherein the pressure membrane is responsive to the cavity tire pressure and the outside air pressure, wherein the pressure membrane is positioned for engagement with the distal end of the regulator body when the tire pressure reaches a set value.

The invention provides in a second aspect a self-inflating tire assembly comprising a tire mounted to a rim, the tire having a tire cavity, and first and second sidewalls extending respectively from first and second tire bead regions to a tire tread region. The invention further includes an air tube connected to the tire and defining an air passageway, the air tube being composed of a flexible material operative to allow a portion of the air tube segment near a tire footprint to substantially close the annular passageway. The assembly also has an inlet regulator device connected to an inlet end of the air tube, the inlet regulator device includes an insert mounted in the tire, wherein the insert has a bore therethrough having a first end located in the tire cavity, a middle portion forming a chamber, and a second end which extends through the tire and which is in fluid communication with the outside air and the chamber, wherein a piston is slidably mounted within the first end of the insert, and a regulator body is received within the chamber and positioned to engage a stop, the chamber having a hole for fluid communication with a pump inlet air tube, a spring mounted within the chamber and having a first end for engagement with the piston and a second end for engagement with a bottom wall of the chamber wherein the regulator body has a interior passageway which extends from a first end to a distal end, wherein the distal end extends into a cavity of the insert.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 5A is a partial section view through the tire.

FIG. 6A is a partial section view through the tire under load at road surface.

DETAILED DESCRIPTION OF THE INVENTION

Figure 1:
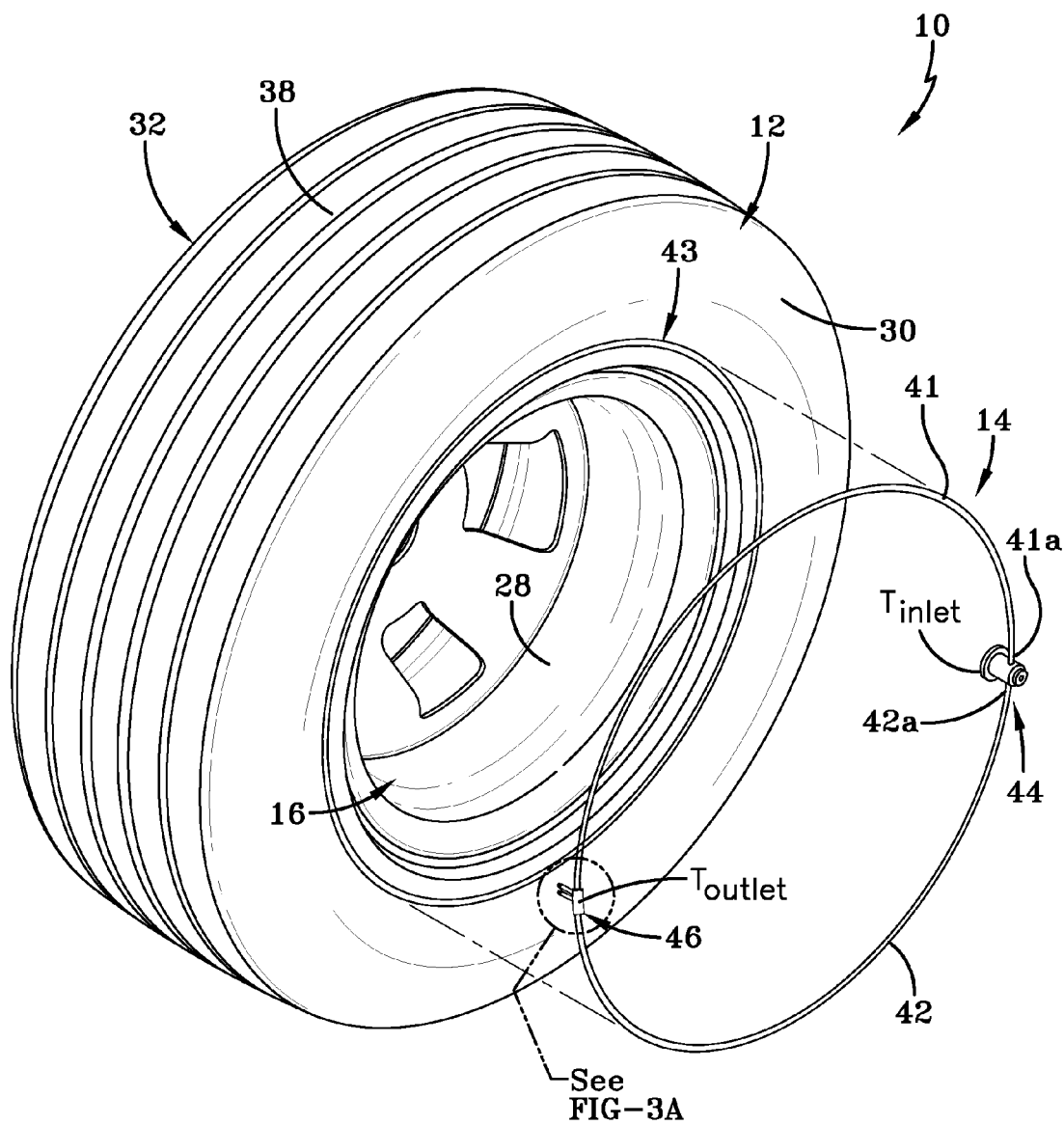
FIG. 1 is an isometric view of tire and rim assembly showing two peristaltic pump assemblies.
Figure 5B:
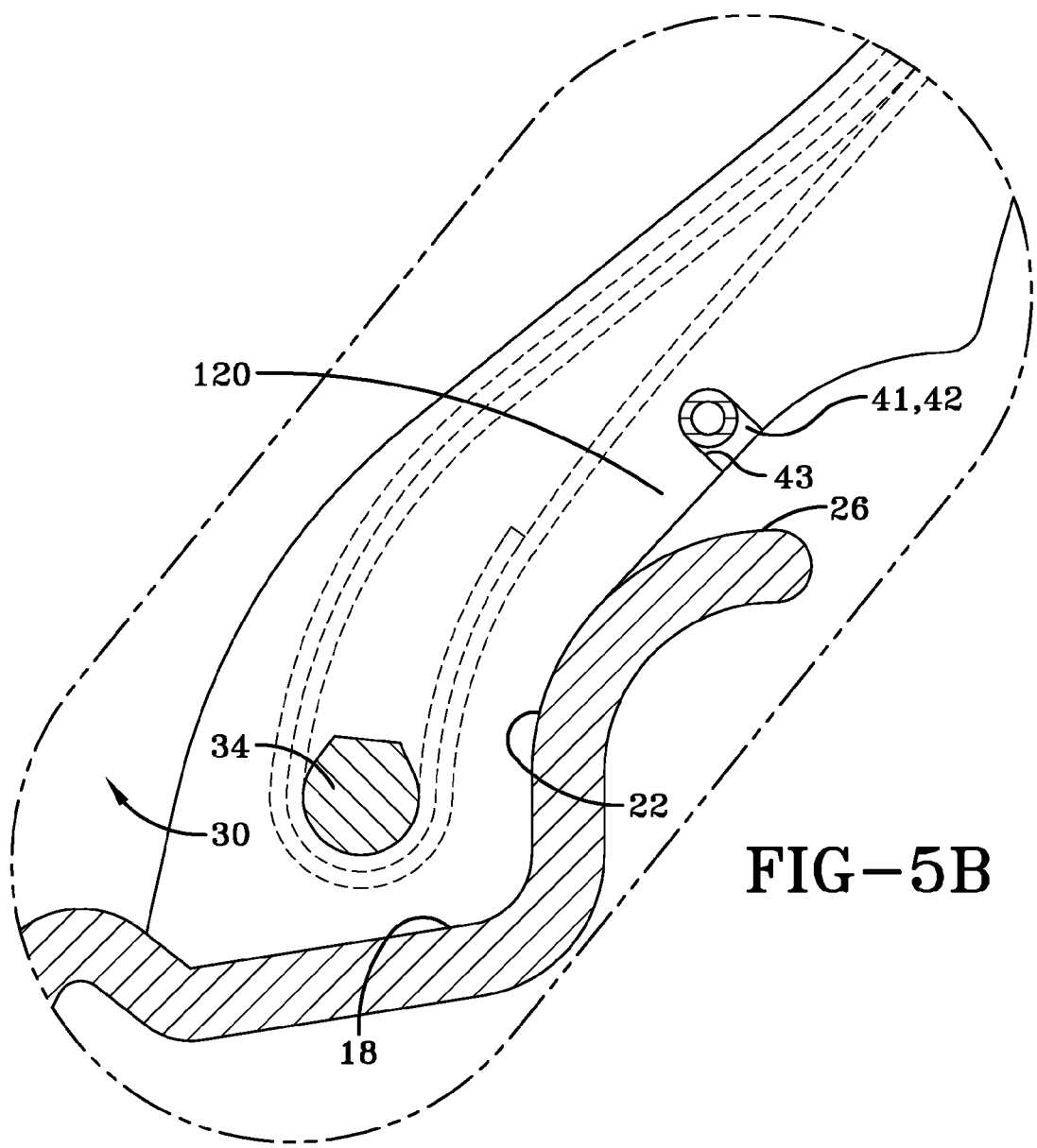
FIG. 5B is an enlarged view of pump tube location next to rim.

Referring to FIGS. 1 and 5A, a tire assembly 10 includes a tire 12, a peristaltic pump assembly 14, and a tire rim 16. The tire mounts in a conventional fashion to a pair of rim mounting surfaces 18, 20 located adjacent outer rim flanges 22,24. The outer rim flanges 22,24 have an outer rim surface 26. An annular rim body 28 joins the rim flanges 22,24 and supports the tire assembly as shown. The tire is of conventional construction, having a pair of sidewalls 30,32 extending from opposite bead areas 34,36 to a crown or tire tread region 38. The tire and rim enclose a tire cavity 40.

Figure 2:
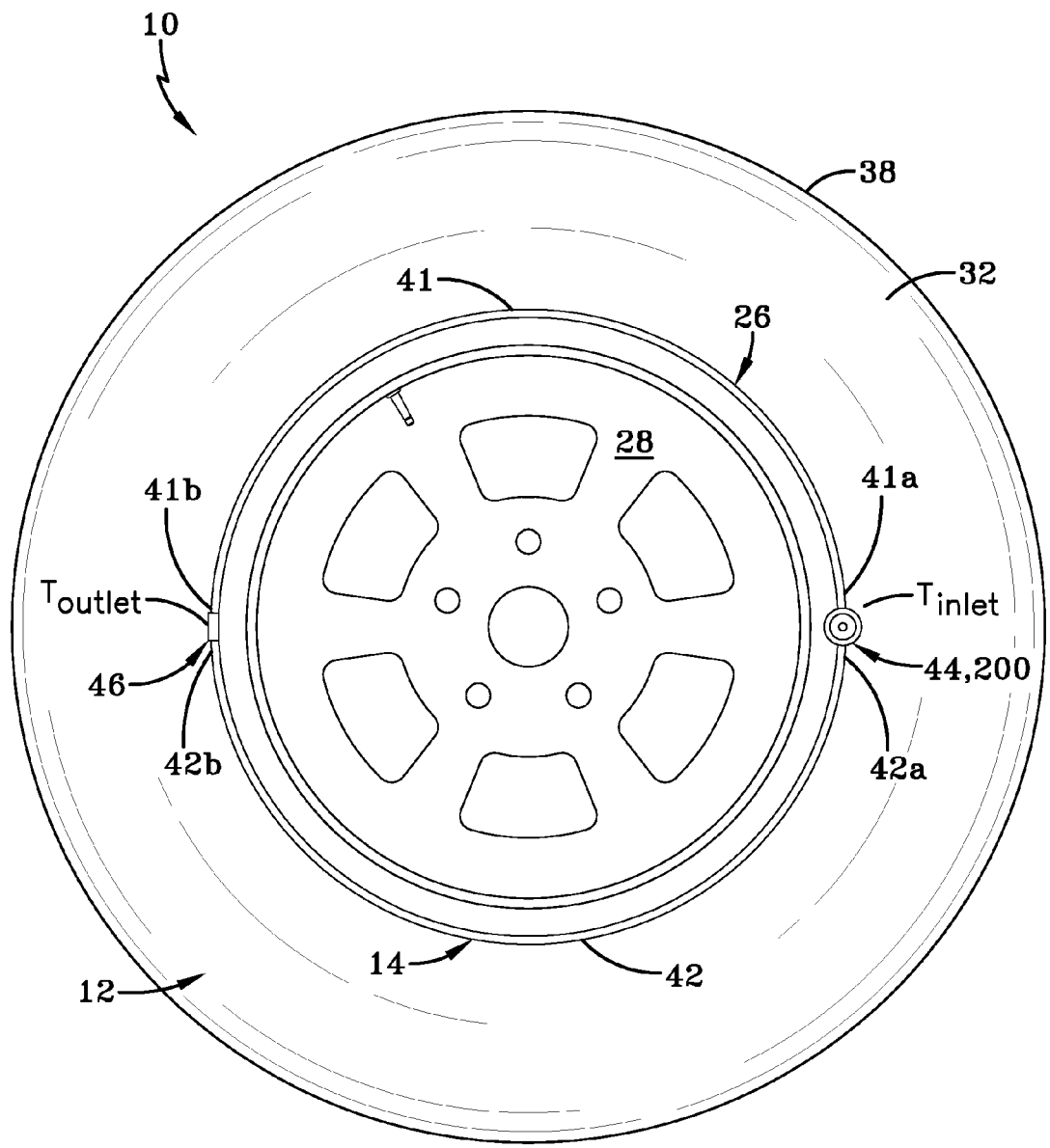
FIG. 2 is a side view of the tire of FIG. 1.

As shown in FIGS. 1, 2 and 4, the peristaltic pump assembly 14 includes a first and second pump 41,42 that are mounted in a passageway 43 located in the sidewall area of the tire, preferably near the bead region. The air passageway is preferably molded into the sidewall of the tire during vulcanization and is preferably annular in shape. Each pump 41,42 has a first end 41a,42a joined together by an inlet device 44 and a second end 41b,42b joined together by an outlet device 46. Each pump 41,42 is comprised of a tube formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized.

Figure 3B:
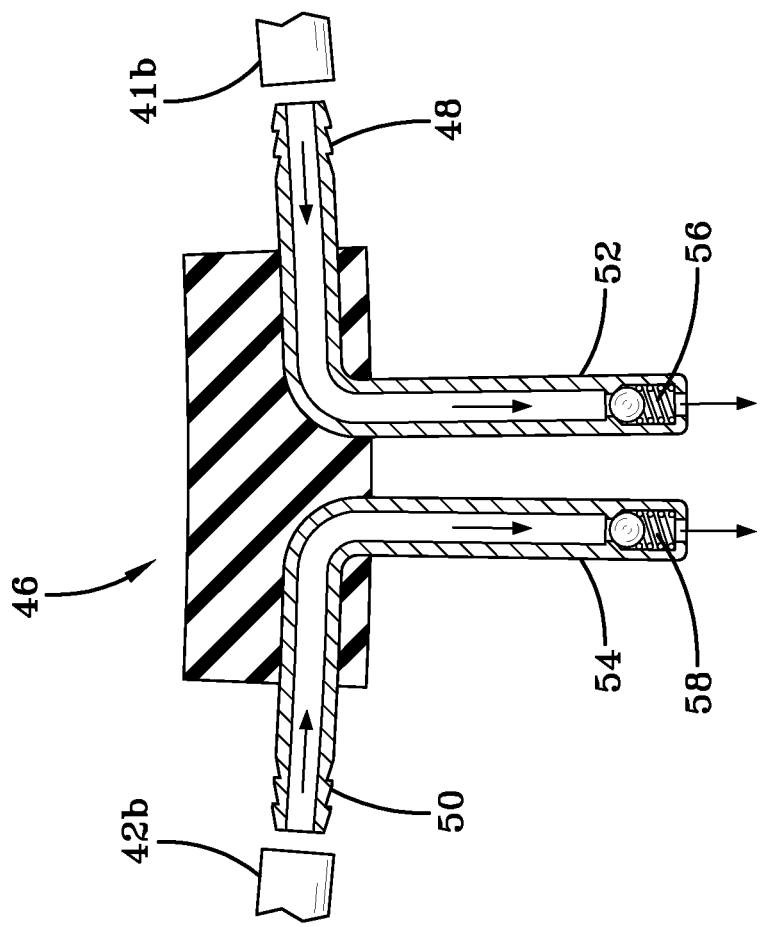
FIG. 3B is a cross-sectional view of the pump outlet mechanism of FIG. 3A.
Figure 3A:
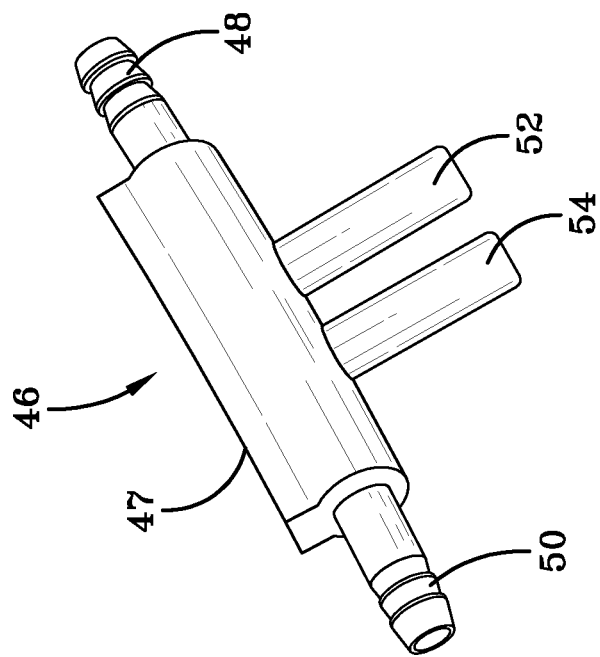
FIG. 3A is an enlarged perspective view of the pump outlet mechanism.

As shown, the inlet device 44 and the outlet device 46 are spaced apart approximately 180 degrees at respective locations forming two 180 degree pumps 41,42. The inlet and outlet device may be located adjacent each other, thus forming a single 360 degree pump. Other variations may be utilized, such as 270 degrees, etc. As shown in FIGS. 3A and 3B, the outlet device 46 is a connector having a body 47 having a first port 48 that connects to pump 41 outlet end 41b. The first port 48 is in fluid communication with outlet port 52. Outlet port 52 extends into the tire cavity so that the pump end 41b is in fluid communication with the tire cavity. The outlet device further includes a second port 50 that connects to pump 42 outlet end 42b. The second port 50 is connected to an outlet port 54 that is located in the tire cavity so that the pump end 42 is in fluid communication with the tire cavity. FIG. 3B further illustrates that each outlet end 52,54 may further comprise a check valve 56,58 to prevent backflow of air into the pump. The outlet ends 52,54 of the outlet device 46 extend into the tire cavity so that the outlet ends are in fluid communication with the internal tire cavity 40.

Figure 8:
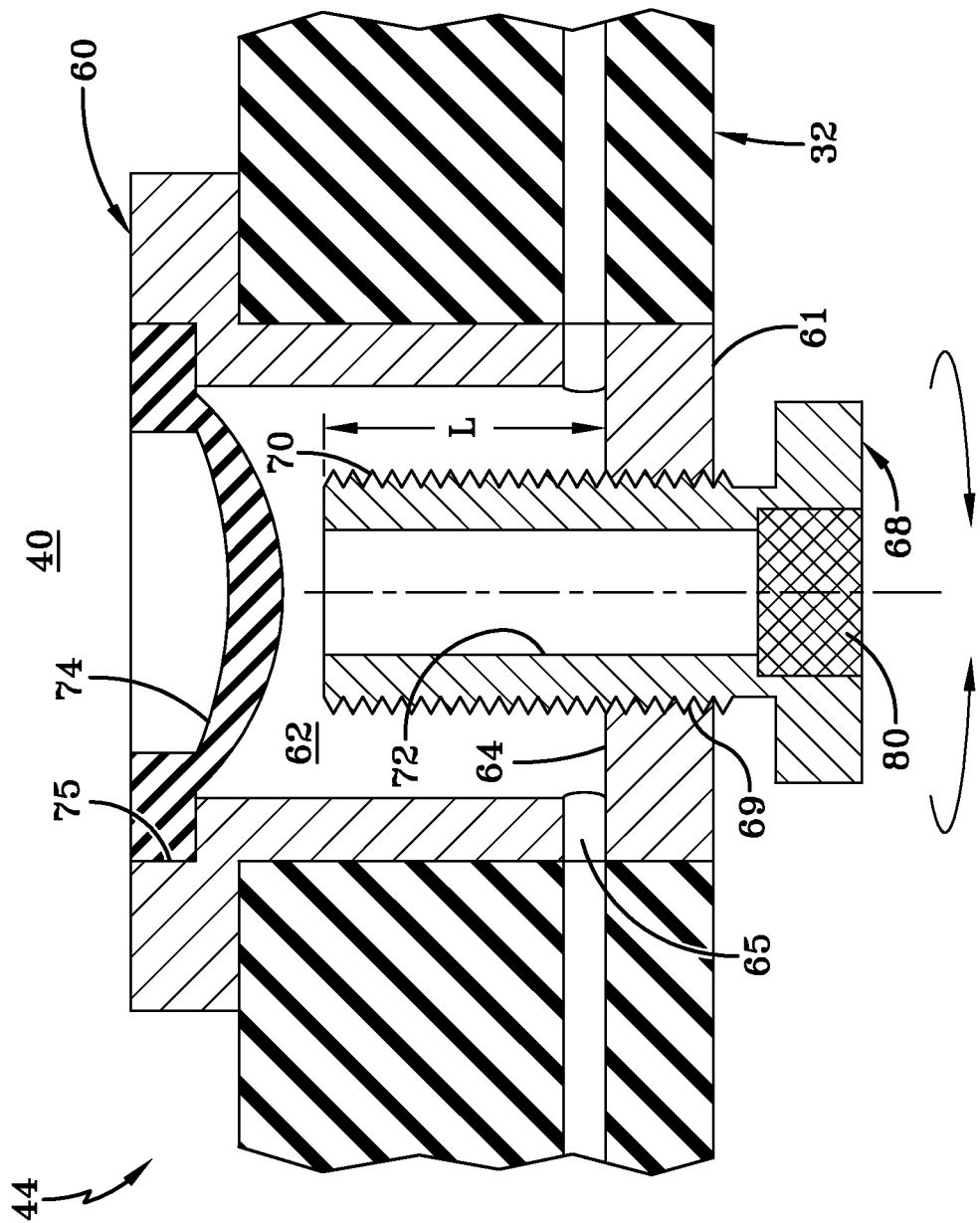
FIG. 8 is a cross-sectional view of a pressure regulator.
Figure 9:
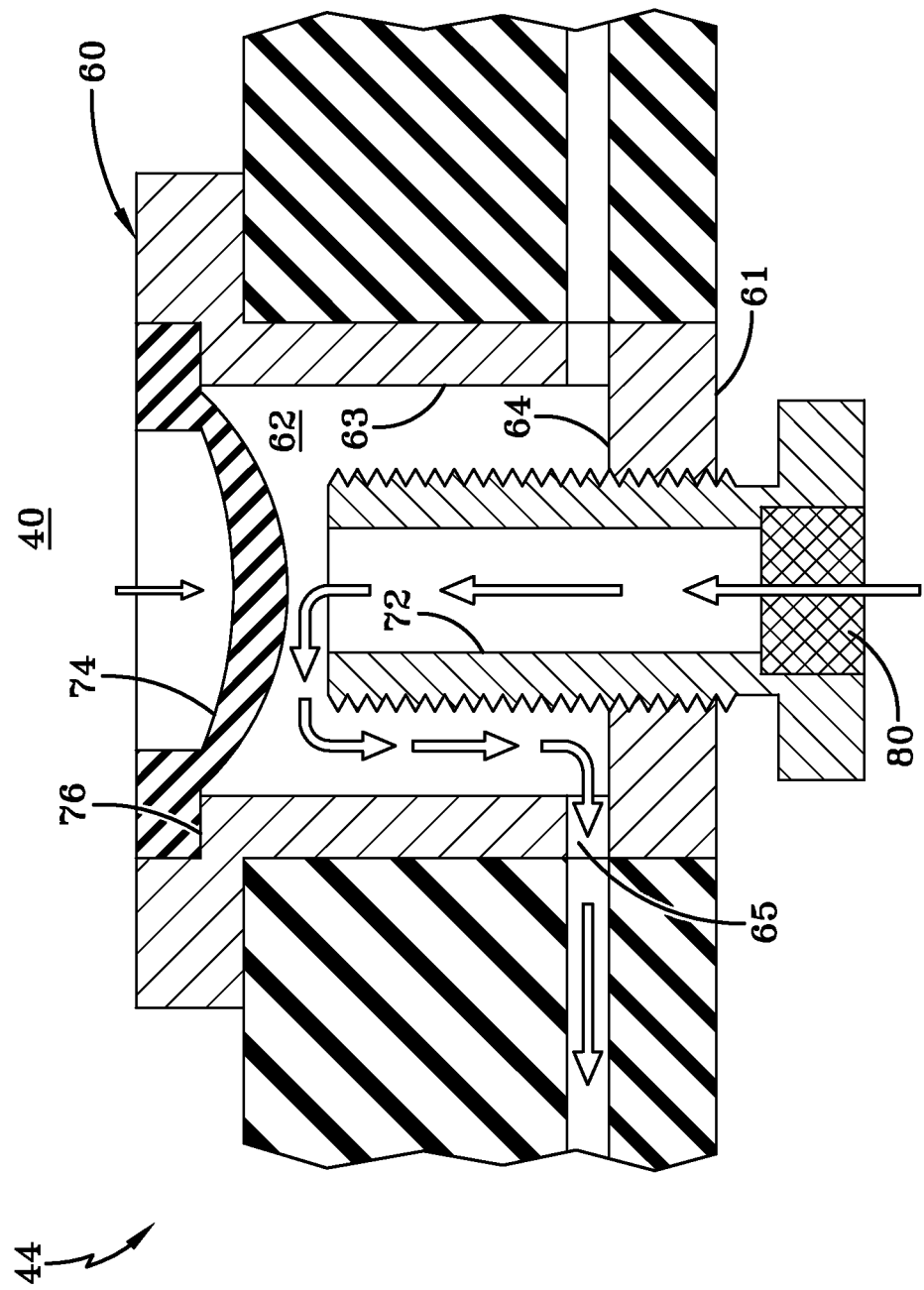
FIG. 9 is a cross-sectional view of the pressure regulator of FIG. 8 shown in operation.
Figure 10:
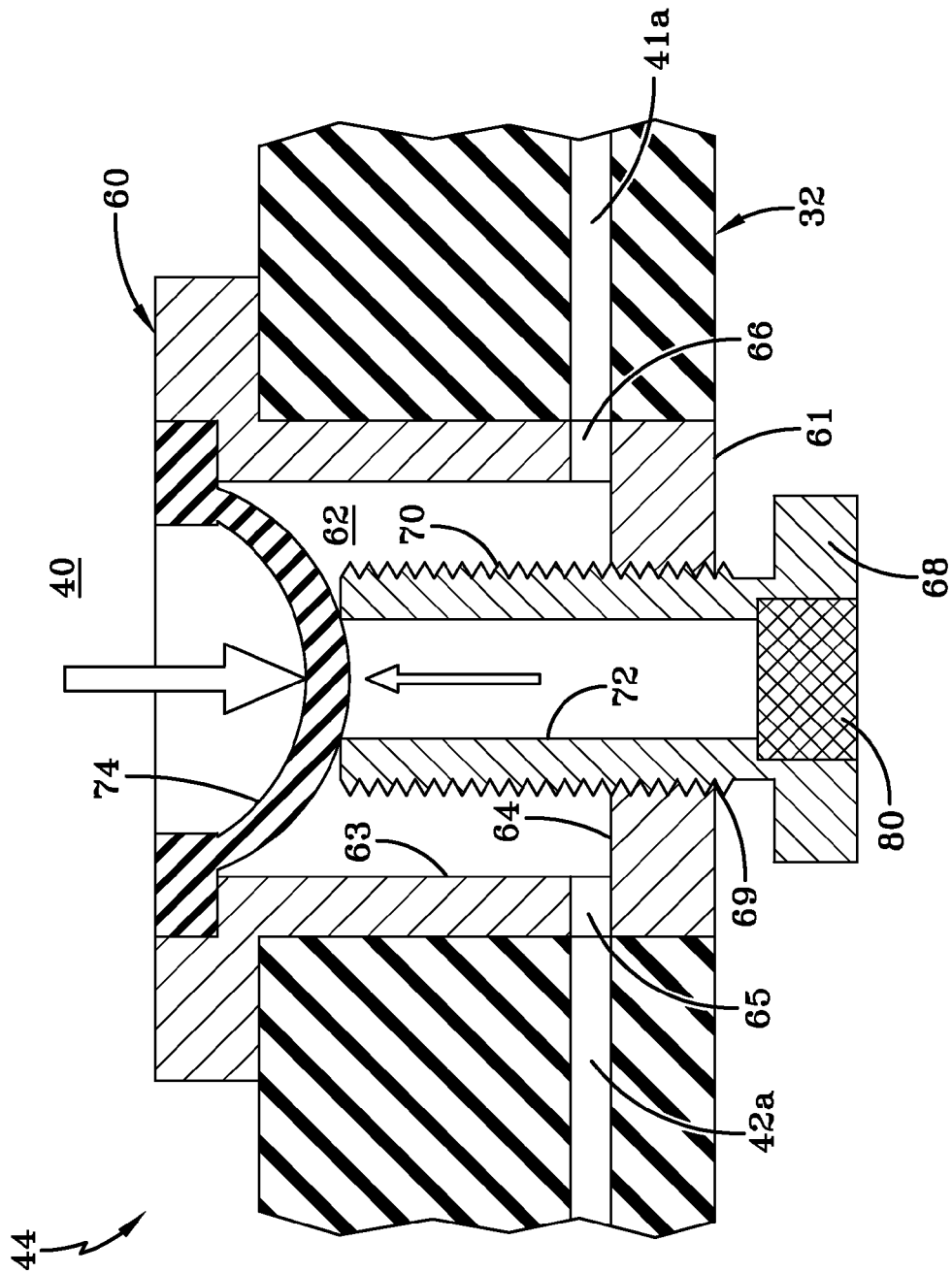
FIG. 10 is a cross-sectional view of the pressure regulator of FIG. 8 shown in the closed position.
Figure 11A:
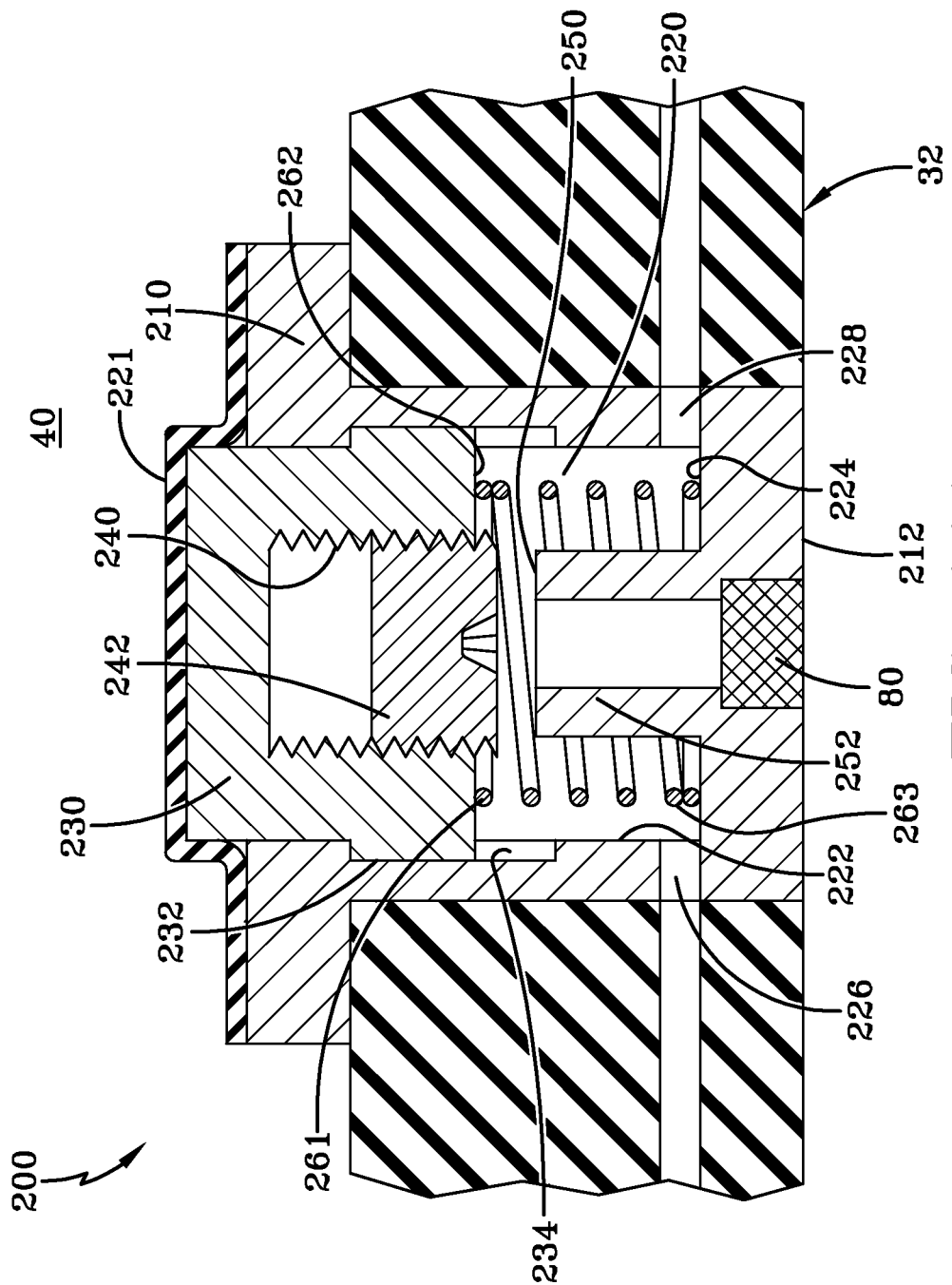
FIG. 11A is a cross-sectional view of a second embodiment of a pressure regulator.
Figure 11B:
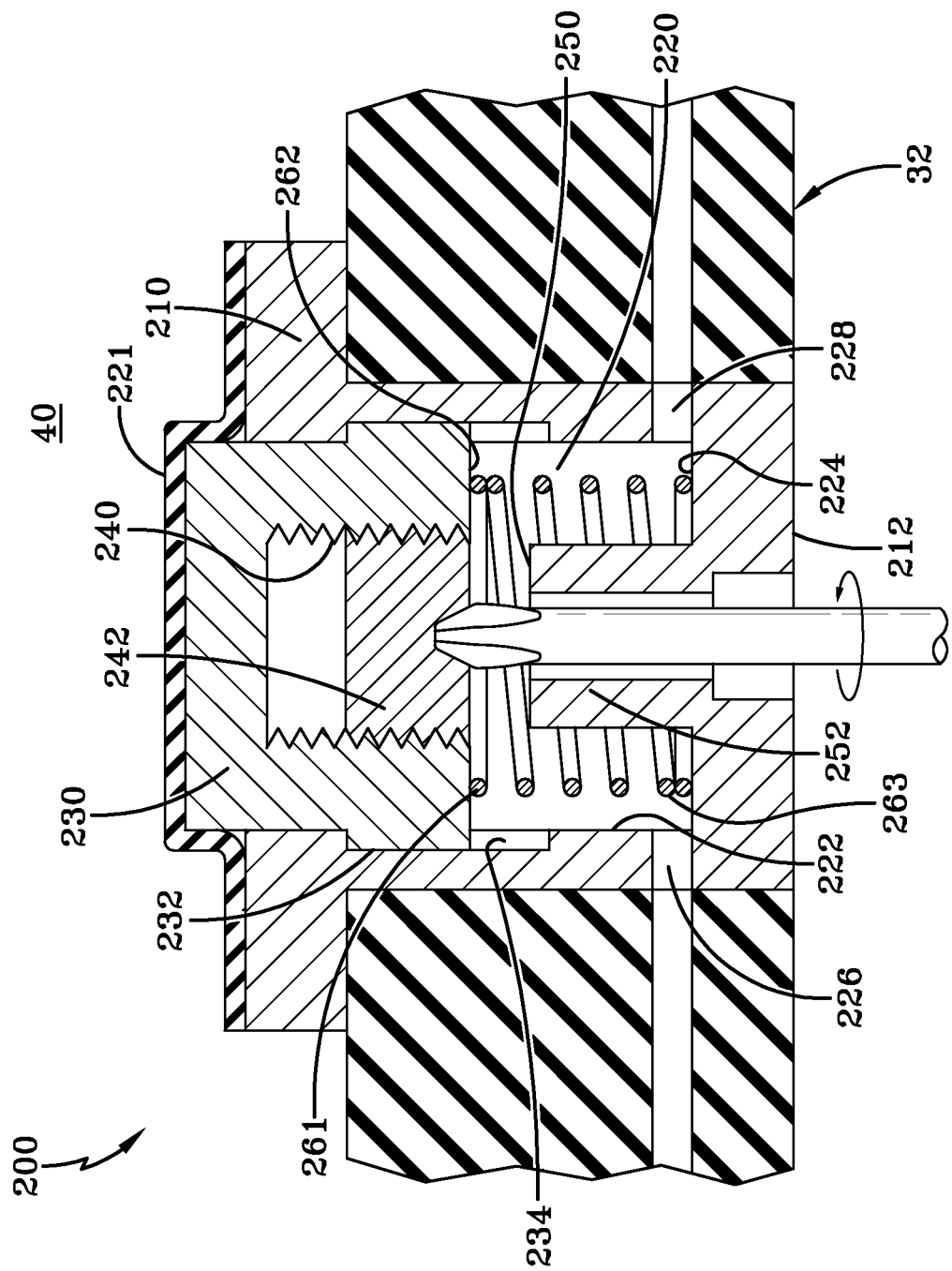
FIG. 11B is a cross-sectional view of the pressure regulator of FIG. 11A showing the adjustability feature.

A first embodiment of an inlet device 44 is shown in FIGS. 8-10. The inlet device functions to regulate the inlet flow of both pumps 41,42. The inlet device 44 includes an outer T shaped insert 60 that may be molded into a green tire and then cured. FIGS. 8-10 illustrate the inlet device installed in the sidewall 32 of a tire, wherein the T shaped portion of the insert is located on the interior portion of the tire sidewall, facing the tire cavity 40. An outer face 61 of the insert is preferably flush with the tire sidewall 32. The insert 60 has an inner chamber 62 formed by sidewalls 63 and bottom wall 64. Two holes 65,66 are located in the inner chamber sidewall 63 for fluid communication with inlet tube ends 41,42a of the pumps 41,42.

A regulator body 68 is received within the inner chamber 62 of the insert through threaded hole 69 of the outer face 61. Preferably, the outer surface of the regulator body is threaded, so that the regulator body can be screwed in or out of the threaded hole 69, thereby adjusting the length of the distal end 70 of the regulator body located within the chamber. The regulator body 68 has an interior channel 72 that extends throughout the regulator body and is in fluid communication with the outside air of the tire and the inner cavity 62 of the insert.

A pressure membrane 74 is received within a hole 75 of the T shaped insert chamber wherein the outer circumference of the pressure membrane is supported by a rim 76 about the inner chamber wall 63. The pressure membrane is preferably disk shaped and formed of a flexible material such as, but not limited to, rubber, elastomer, plastic or silicone. The pressure membrane 74 is responsive to the pressure in the interior of the tire cavity 40 on one side of the membrane, and is responsive to the pressure in inlet chamber 63 on the other side of the membrane. As shown in FIG. 8, if the tire pressure is sufficiently high, the membrane flexes and engages the distal end 70 of the regulator body 68, wherein the pressure membrane seals off flow from the channel 72 so that no airflow may enter the pump inlet ends 41a,42a. As the tire loses air pressure, the pressure membrane 74 retracts from the distal end 70 of the regulator body, opening up the regulator channel 72. Outside air may then enter the channel 72 of the regulator body, then through the chamber 63 and out the holes 65,66 into the pump inlet ends 41a,42a.

The operation of the inlet regulator device 44 may now be described. The pressure membrane is responsive to the pressure in the tire cavity and the pressure in the regulator body chamber 63. The pressure in the chamber is similar to the pressure in the outside air. When the tire pressure is sufficiently high, the pressure membrane is responsive to the tire pressure, and if the pressure is sufficiently higher than the chamber pressure, the pressure membrane is forced into engagement with the distal end 70 of the regulator body, thus sealing off flow to the inlet ends of the pump, as shown in FIG. 10. As the tire pressure decreases, the pressure membrane unseats from the distal end of the regulator body as shown in FIG. 9, allowing air to enter the chamber 63 and into the inlet ends of the pumps 41,42 via side holes 65,66 in the chamber walls. As shown in FIG. 8, the inlet regulator device 44 may be adjusted by screwing (rotating) the regulator body 68 in either direction in order to increase or decrease the distance from the distal end of the regulator body to the pressure membrane, thus altering the pressure at which flow will be shut off to the pumps.

Figure 12:
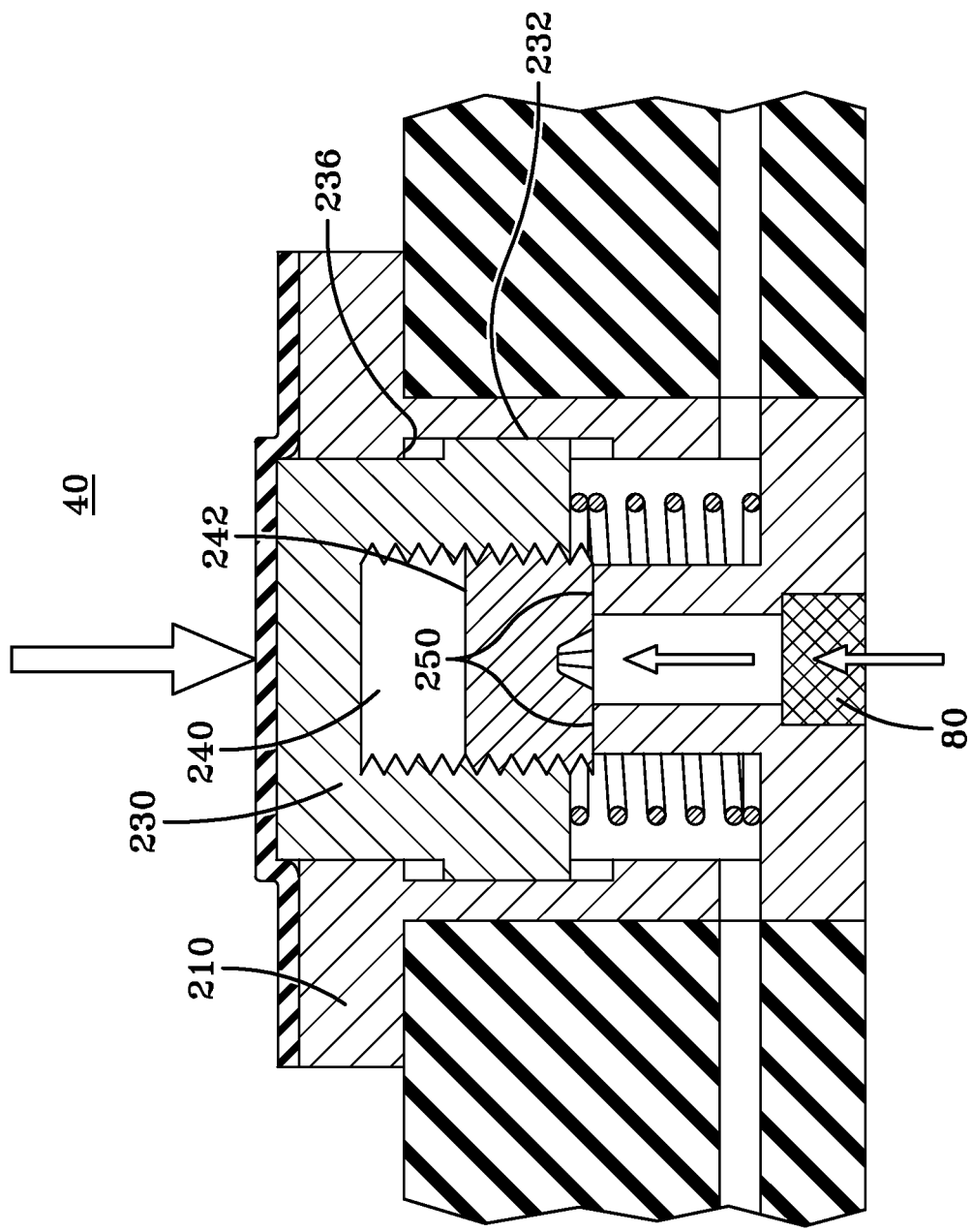
FIG. 12 is a cross-sectional view of the pressure regulator of FIG. 11 shown in operation in the closed position.
Figure 13:
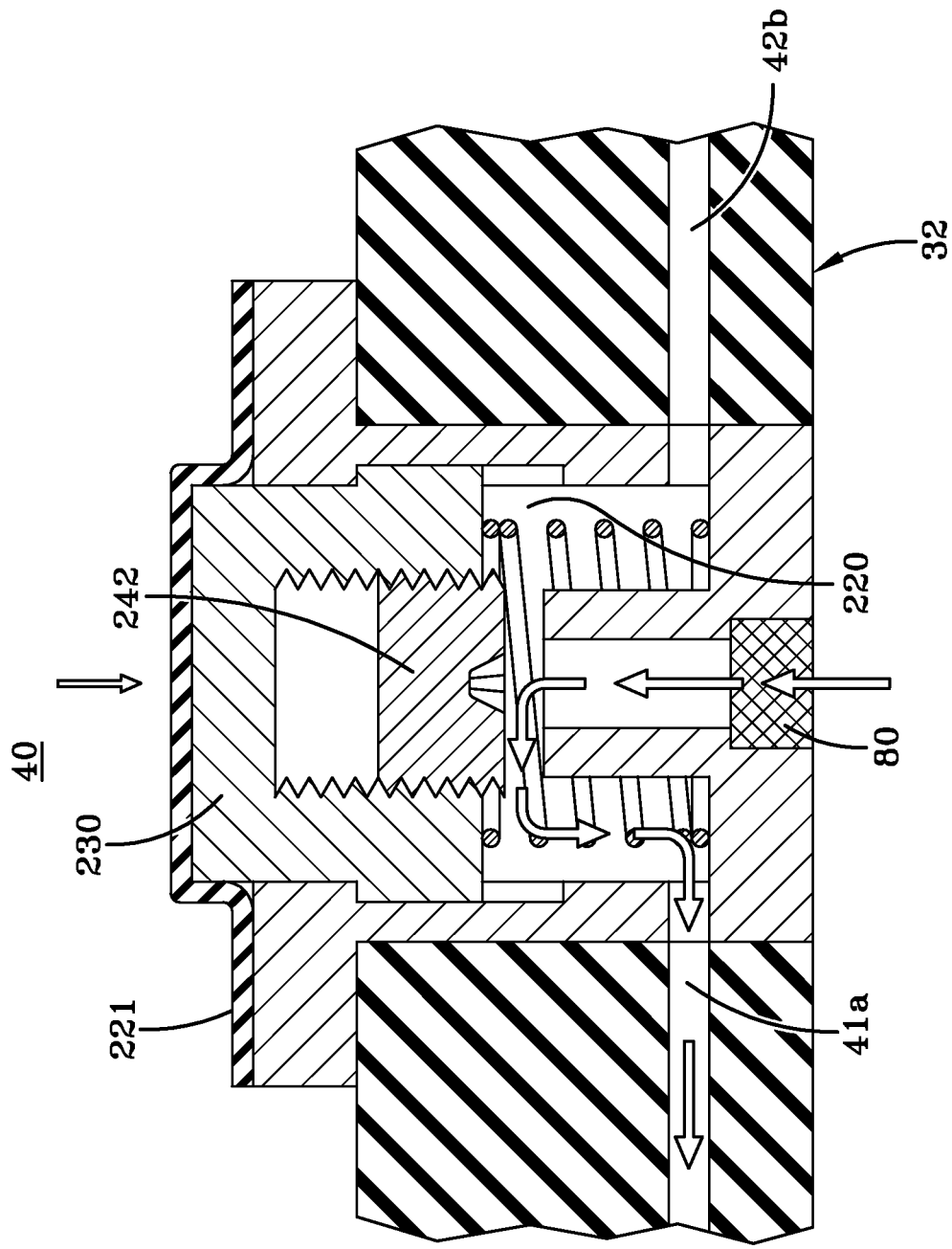
FIG. 13 is a cross-sectional view of the pressure regulator of FIG. 11 shown in operation in the open position.
Figure 14:
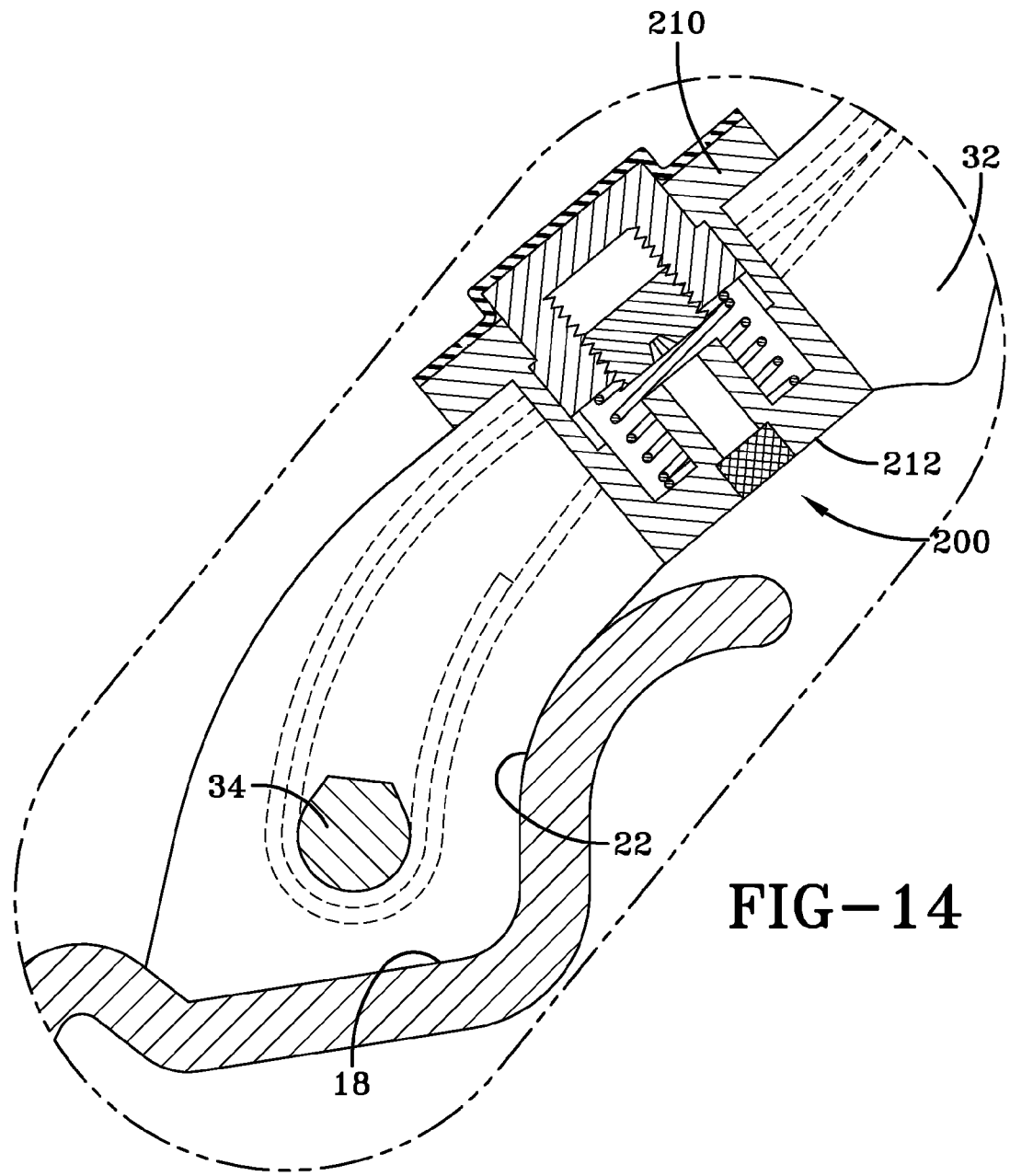
FIG. 14 is an enlarged cross sectional view of the tire and rim assembly with the pressure regulator of FIG. 11 shown mounted in the tire.

A second embodiment of an inlet device 200 is shown in FIGS. 11-14. The inlet device functions to regulate the inlet flow of both pumps 41,42. The inlet device 200 includes an outer T shaped insert 210 that may be molded into a green tire and then cured. FIG. 14 illustrates the inlet device installed in the sidewall 32 of a tire, wherein the T shaped portion of the insert is located on the interior portion of the tire sidewall, facing the tire cavity 40. An outer face 212 of the insert is preferably flush with the tire sidewall 32. The insert has an inner chamber 220 formed by sidewalls 222 and bottom wall 224. Two holes 226,228 are located in the inner chamber sidewall 222 for fluid communication with inlet tube ends 41,42a of the pumps 41,42.

A regulator piston 230 is slidably received within the inner chamber 220 of the insert. The regulator piston 230 has an outer flanged surface 232 which is slidably received within a slot 234 of the chamber sidewall. An outer stop 236 located on the upper chamber wall of the T shaped insert retains the piston 230 within the chamber. An optional outer membrane 221 is received over the top of the piston 230 to make the system airtight and to prevent leakage of air between the piston and the cylinder 234. The regulator piston has an interior threaded bore 240 in which an adjustable member 242 is received. The adjustable member 242 is positioned to engage an inner stop 250 located on an interior annular wall 252 of the T shaped insert 210. The interior annular wall 252 surrounds a channel 266 that extends from the outer face 212 to the inner chamber 220 so that the outside air is in fluid communication with the chamber. A spring 260 is positioned in the insert chamber 220 with a first end 261 engaging the piston end wall 262 and a second end 263 engaging the bottom wall of the chamber 224. The spring biases the piston and the adjustable member away from the inner stop 250.

The operation of the inlet regulator device 200 may now be described. The regulator piston 230 is responsive to the pressure in the tire cavity, the pressure in the insert chamber 220 and the spring 260. The pressure in the chamber is similar to the pressure in the outside air. When the tire pressure is sufficiently high, the regulator piston overcomes the spring force and is forced into engagement with the stop 250 of the insert, thus sealing off flow to the inlet ends of the pump, as shown in FIG. 12. As the tire pressure decreases, the spring force overcomes the force from the tire pressure, pushing the piston 230 away from the stop 250 as shown in FIG. 13, allowing outside air to enter the chamber 220 and into the inlet ends of the pumps 41,42 via side holes 226,228 in the chamber walls. The inlet regulator device 200 may be adjusted by screwing (rotating) the adjustable member 242 in either direction in order to increase or decrease the distance from the distal end of the adjustable member to the stop 250, thus altering the pressure at which flow will be shut off to the pumps.

Figure 4A:
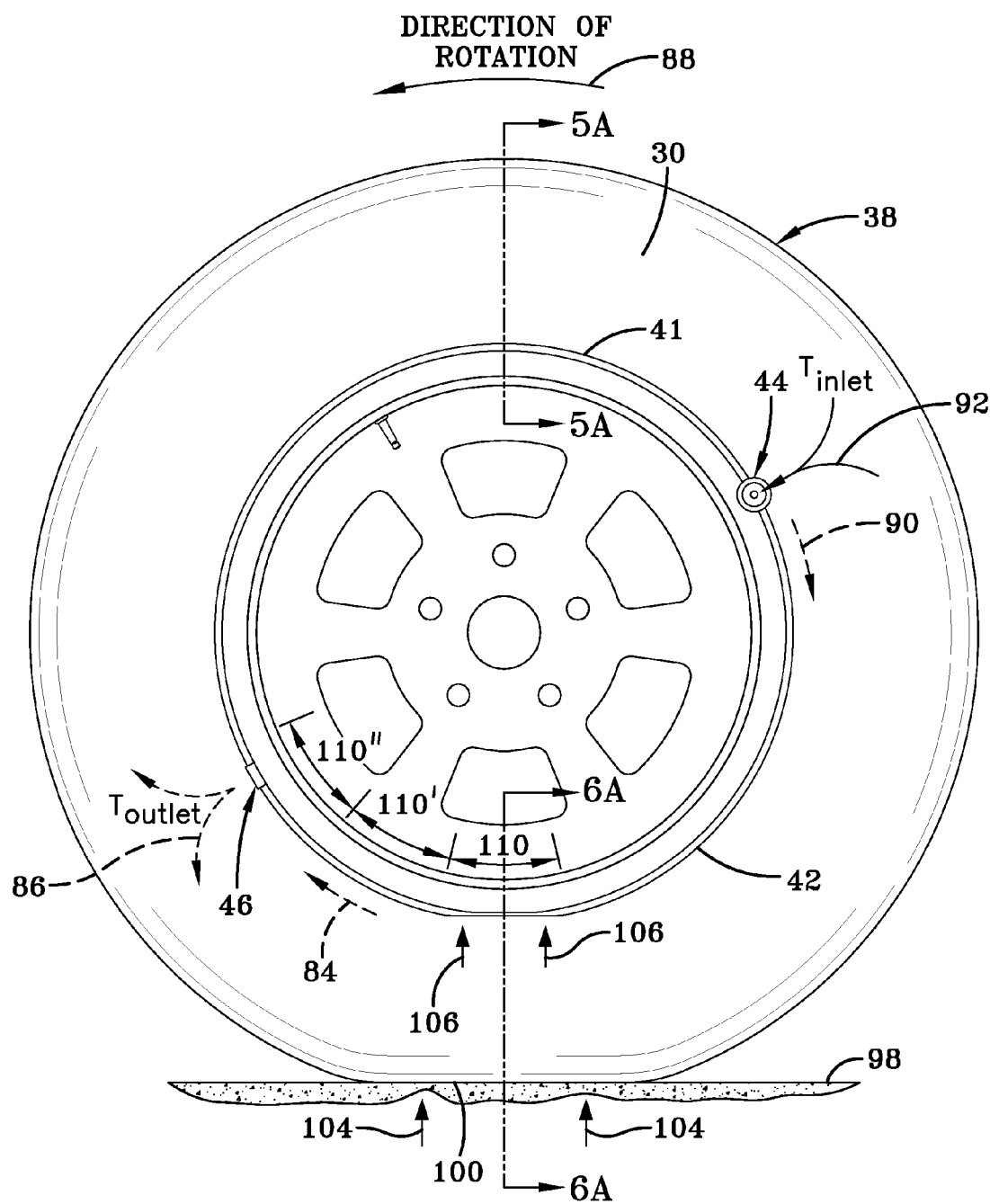
FIGS. 4A and 4B illustrate side views of the tire, rim, tubing, and valves showing operation of the pump to the tire cavity when the tire rotates.

As will be appreciated from FIG. 4A, the inlet device 44 and the outlet device 46 are in fluid communication with the circular air tube 42 and positioned generally 180 degrees apart. As the tire rotates in a direction of rotation 88, a footprint 100 is formed against the ground surface 98. A compressive force 104 is directed into the tire from the footprint 100 and acts to flatten a segment 110 of the pump 42 a as shown at numeral 106. Flattening of the segment 110 of the pump 42 forces a portion of air located between the flattened segment 110 and the outlet device 46, in the direction shown by arrow 84 towards the outlet device 46.

As the tire continues to rotate in direction 88 along the ground surface 98, the pump tube 42 will be sequentially flattened or squeezed segment by segment in a direction 90 which is opposite to the direction of tire rotation 88. The sequential flattening of the pump tube 42 segment by segment causes the column of air located between the flattened segments to and the outlet device 46 be pumped in the direction 84 within pump 42 to the outlet device 46.

With the tire rotating in direction 88, flattened tube segments are sequentially refilled by air 92 flowing into the inlet device 44 along the pump tube 42 in the direction 90 as shown by FIG. 4A. The inflow of air from the inlet device 44 in direction 90 continues until the outlet device 46, rotating counterclockwise as shown with the tire rotation 88, passes the tire footprint. 100.

Figure 4B:
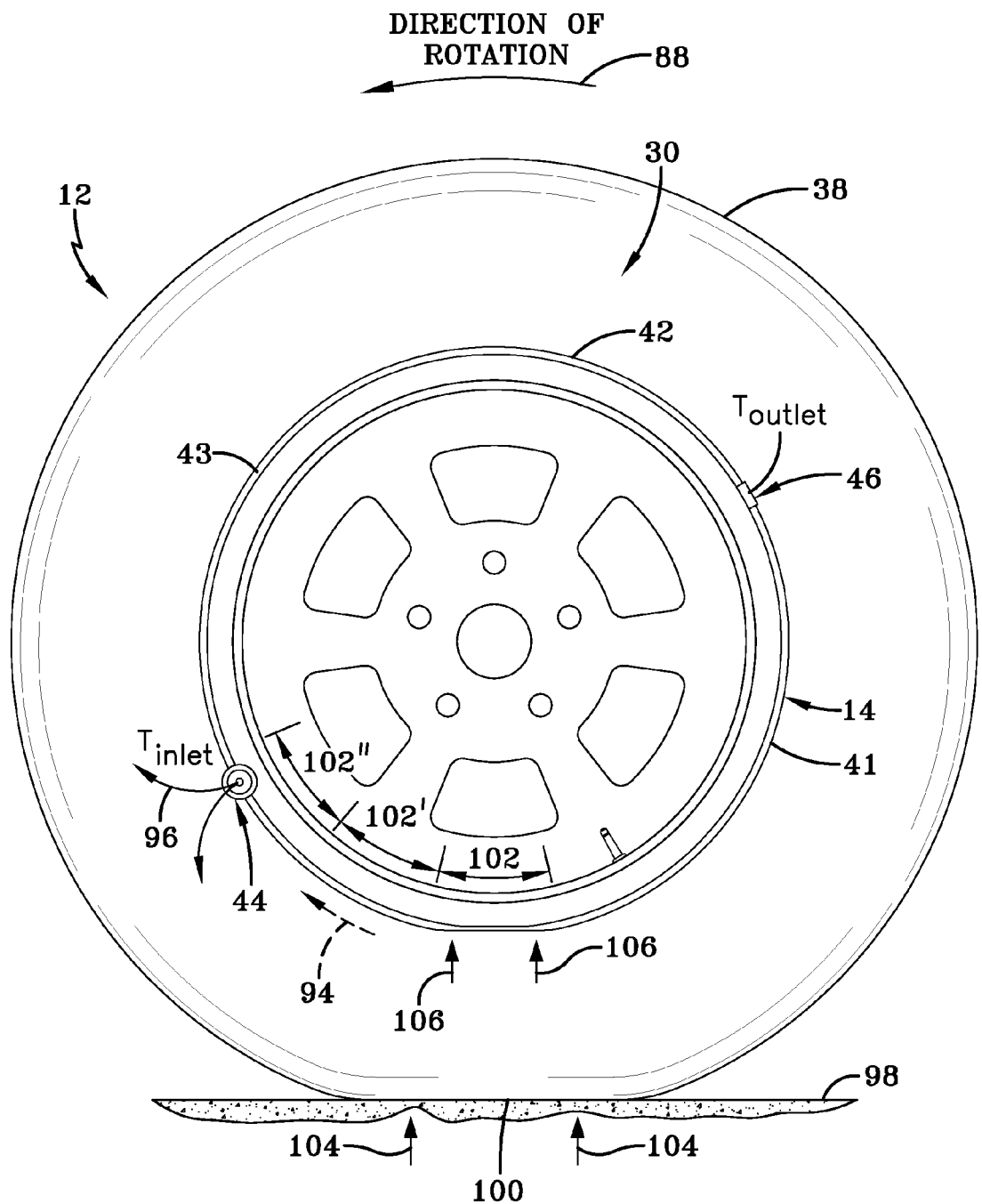

FIG. 4B shows the orientation of the peristaltic pump assembly 14 in such a position. In the position shown, the tube 42 continues to be sequentially flattened segment by segment 102, 102', 102", opposite the tire footprint by compressive force 104 as shown at numeral 106. Air is pumped in the clockwise direction 94 to the inlet device 44 where it is evacuated or exhausted from the passageway 43. Passage of exhaust air 96 from the inlet device 44 is through the filter 80 which acts to self-clean the filter of accumulated debris or particles within the porous medium. With the evacuation of pumped air out of the inlet device 44, the outlet device is in the closed position and air does not flow therefrom to the tire cavity. When the tire rotates further in counterclockwise direction 88 until the inlet device 44 passes the tire footprint 100 (as shown in FIG. 4A), the airflow resumes to the outlet device 46 causing the pumped air to flow out (86) to the tire cavity 40.

The above-described cycle is then repeated for each tire revolution, half of each rotation resulting in pumped air going to the tire cavity and half of the rotation the pumped air is directed back out the inlet device filter 80 to self-clean the filter. It will be appreciated that while the direction of rotation 88 of the tire 12 is shown in FIGS. 4A and 4B to be counterclockwise, the subject tire assembly and its peristaltic pump assembly 14 will function in like manner in a (clockwise) reverse direction of rotation to that shown at numeral 88. The peristaltic pump is accordingly bi-directional and equally functional with the tire assembly moving in a forward or a reverse direction of rotation.

Figure 6B:
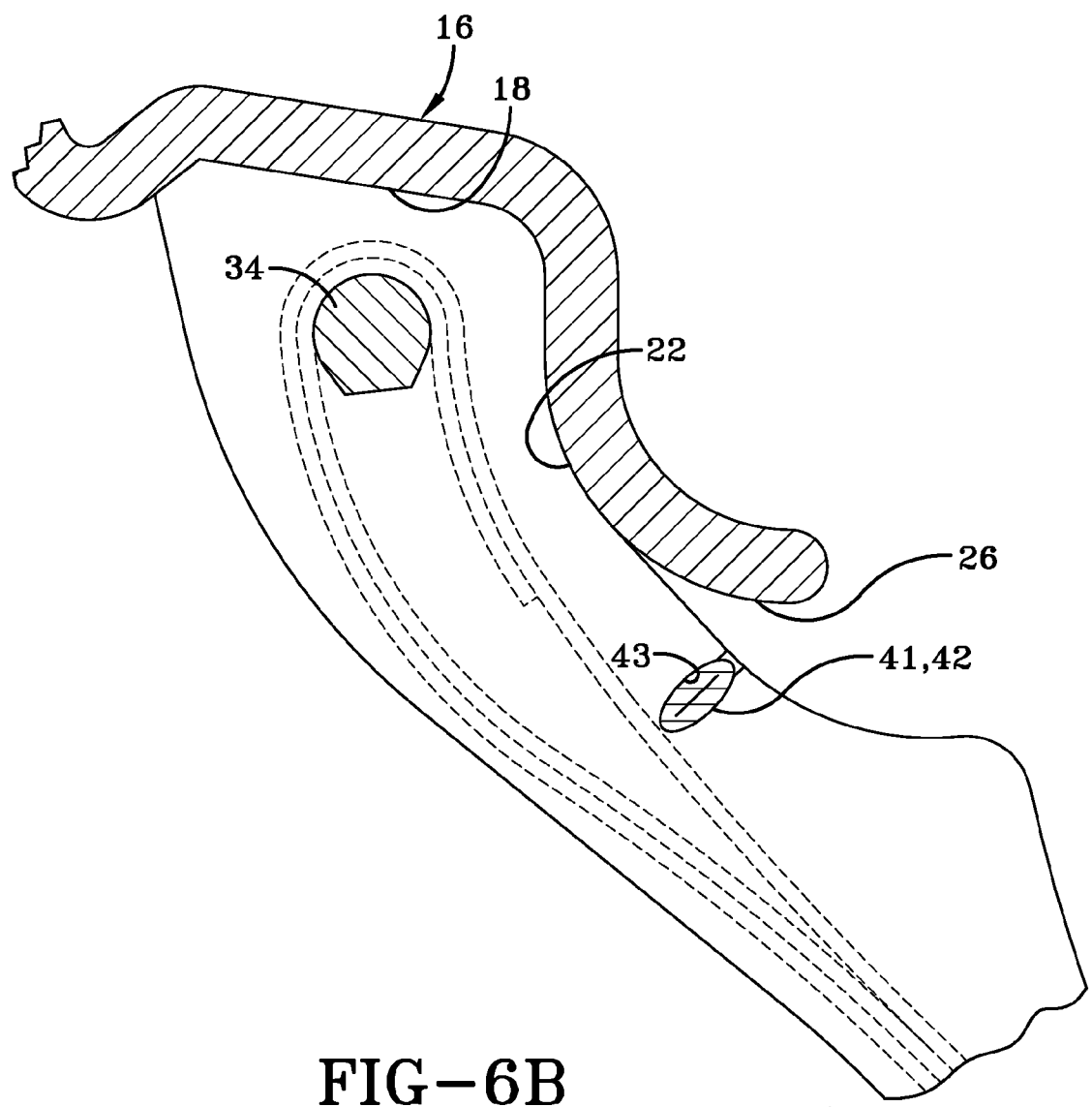
FIG. 6B is an enlarged view of FIG. 6A illustrating the tube being compressed in the tire bead area.
Figure 7:
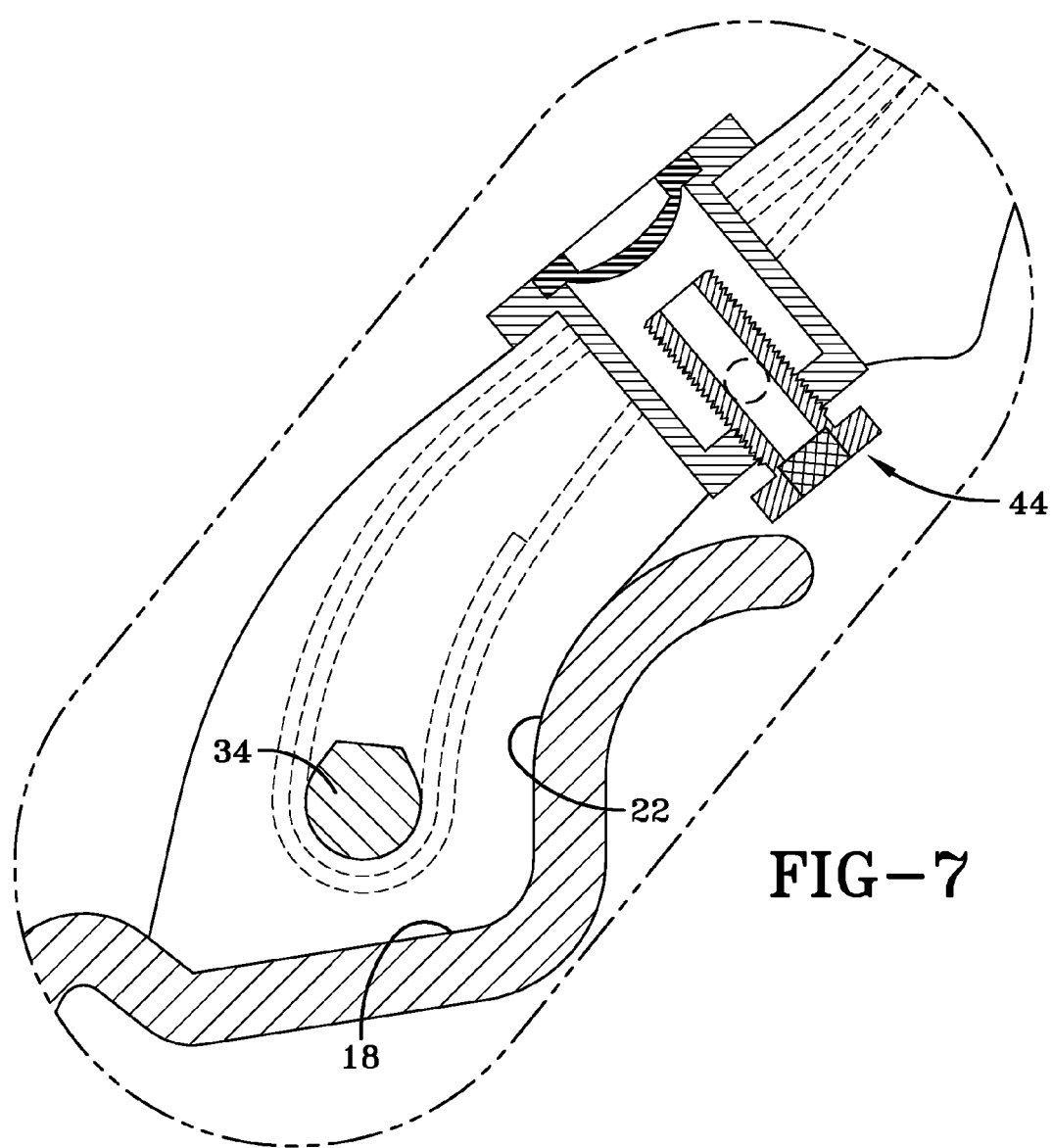
FIG. 7 is an enlarged cross sectional view of the tire and rim assembly with the pressure regulator shown mounted in the tire.

The location of the peristaltic pump assembly will be understood from FIGS. 5-6. In one embodiment, the peristaltic pump assembly 14 is positioned in the tire sidewall, radially outward of the rim flange surface 26 in the chafer 120. So positioned, the air tube 42 is radially inward from the tire footprint 100 and is thus positioned to be flattened by forces directed from the tire footprint as described above. The segment that is opposite the footprint 100 will flatten from the compressive force 114 from the footprint 100 pressing the tube segment against the rim flange surface 26. Although the positioning of the tube 42 is specifically shown as between a chafer 120 of the tire at the bead region 34 and the rim surface 26, it is not limited to same, and may be located at any region of the tire such as anywhere in the sidewall or tread. The diametric sizing of the peristaltic pump air tube 42 is selected to span the circumference of the rim flange surface 26, although it is not limited to same.

From the forgoing, it will be appreciated that the subject invention provides a bi-directionally peristaltic pump for a self-inflating tire in which a circular air tube 42 flattens segment by segment and closes in the tire footprint 100. The air inlet T-device 44 may include a filter 80 and be self-cleaning. The peristaltic pump assembly 14 pumps air under rotation of the tire in either direction, one half of a revolution pumping air to the tire cavity 40 and the other half of a revolution pumping air back out of the inlet device 44 (filter 80). The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
   a. a tire mounted to a rim, the tire having a tire cavity, first and second sidewalls extending respectively from first and second tire bead regions to a tire tread region;
   b. an air tube connected to the tire and defining an air passageway, the air tube being composed of a flexible material operative to allow a portion of the air tube segment to substantially close the air passageway,
   c. an inlet regulator device connected to an inlet end of the air tube, the inlet regulator device includes an insert mounted in the tire, wherein the insert has a bore therethrough having a first end located in the tire cavity, and a second end which extends through the tire, wherein a pressure membrane is received within the first end of the insert, and a regulator body is received within the second end of the insert, wherein the regulator body has a interior passageway which extends from a first end to a distal end, wherein the distal end extends into a cavity of the insert, wherein the pressure membrane is responsive to the cavity tire pressure and the outside air pressure, wherein the pressure membrane is positioned for engagement with the distal end of the regulator body when the tire pressure reaches a set value.

2. The self-inflating tire assembly of claim 1 wherein the second end of the insert forms an outer face flush with the outer surface of the tire.

3. The self-inflating tire assembly of claim 1 wherein insert is mounted in the sidewall of the tire.

4. The self-inflating tire assembly of claim 1 wherein the regulator body has a threaded outer surface and the second end of the insert has a threaded hole for receiving the threaded outer surface of the regulator body.

5. The tire assembly of claim 1, wherein the air tube is sequentially flattened by the tire footprint to pump air along the air passageway in either a forward tire direction of rotation or a reverse tire direction of rotation.

6. The tire assembly of claim 1, wherein the outlet device and the inlet regulator device are mounted to the air tube substantially 180 degrees apart.

7. The tire assembly of claim 1, wherein the outlet device and the inlet regulator device are mounted to the air tube substantially 180 degrees apart.

8. A self-inflating tire assembly comprising:
   a. a tire mounted to a rim, the tire having a tire cavity, first and second sidewalls extending respectively from first and second tire bead regions to a tire tread region;
   b. an air tube connected to the tire and defining an air passageway, the air tube being composed of a flexible material operative to allow a portion of the air tube segment to substantially close the air passageway,
   c. an inlet regulator device connected to an inlet end of the air tube, the inlet regulator device includes an insert mounted in the tire, wherein the insert has a bore therethrough having a first end located in the tire cavity, a middle portion forming a chamber, and a second end which extends through the tire and which is in fluid communication with the outside air and the chamber, wherein a piston is slidably mounted within the first end of the insert, and a regulator body is received within the chamber and positioned to engage a stop, the chamber having a hole for fluid communication with a pump inlet air tube, a spring mounted within the chamber and having a first end for engagement with the piston and a second end for engagement with a bottom wall of the chamber wherein the regulator body has a interior passageway which extends from a first end to a distal end, wherein the distal end extends into a cavity of the insert.

* * * * *